US011407585B2

(12) United States Patent
Whitfield, Jr. et al.

(10) Patent No.: US 11,407,585 B2
(45) Date of Patent: Aug. 9, 2022

(54) AUTOMATIC CONTROL OF A REFUSE FRONT END LOADER

(71) Applicant: The Heil Co., Chattanooga, TN (US)

(72) Inventors: Ralph Waldo Whitfield, Jr., Rainbow City, AL (US); Brian Huston Ham, Huntsville, AL (US); John M. Curotto, Sonoma, CA (US); Andrew Blaine Cooper, Signal Mountain, TN (US); Brian T. Parker, Signal Mountain, TN (US)

(73) Assignee: The Heil Company, Chattanooga, TN (US)

( * ) Notice: Subject to any disclaimer, the term of this patent is extended or adjusted under 35 U.S.C. 154(b) by 515 days.

(21) Appl. No.: 16/229,070

(22) Filed: Dec. 21, 2018

(65) Prior Publication Data

US 2019/0218032 A1 Jul. 18, 2019

Related U.S. Application Data

(63) Continuation of application No. 15/244,291, filed on Aug. 23, 2016, now Pat. No. 10,196,206, which is a (Continued)

(51) Int. Cl.
*B65F 3/02* (2006.01)
*B65F 3/04* (2006.01)
(Continued)

(52) U.S. Cl.
CPC ........ *B65F 3/041* (2013.01); *B65F 2003/025* (2013.01); *B65F 2003/0279* (2013.01);
(Continued)

(58) Field of Classification Search
CPC ................ B65F 3/041; B65F 2003/025; B65F 2003/0279; B65F 2003/146; Y02W 90/00; G06Q 10/30
(Continued)

(56) References Cited

U.S. PATENT DOCUMENTS 3,282,453 A 11/1966 Wood
3,474,923 A 10/1969 Anderson
(Continued)

FOREIGN PATENT DOCUMENTS

FR 2964648 3/2012
JP 2013060281 4/2013

OTHER PUBLICATIONS

CA Office Action in Canadian Appln. No. 2851938, dated Jun. 3, 2020, 6 pages.
(Continued)

*Primary Examiner* — Krishnan Ramesh
(74) *Attorney, Agent, or Firm* — Fish & Richardson P.C.

(57) ABSTRACT

An automatic control system for a refuse vehicle includes a mode select switch disposed within the vehicle that generates a mode select signal based on input from an operator of the vehicle, a control mechanism disposed within the vehicle that operates in response to the mode select signal, and a plurality of sensors adapted to sense a plurality of characteristics of the vehicle and adapted to communicate the plurality of sensed characteristics. The system further includes a control module that receives control instructions from the control mechanism and selectively controls at least one component of a plurality of components of the vehicle based on the mode select signal, at least one of the plurality of sensed characteristics, and the control instructions.

20 Claims, 4 Drawing Sheets

Related U.S. Application Data continuation of application No. 14/276,423, filed on May 13, 2014, now Pat. No. 9,428,334.

(60) Provisional application No. 61/824,605, filed on May 17, 2013.

(51) Int. Cl.
  *B65F 3/14* (2006.01)
  *G06Q 10/00* (2012.01)

(52) U.S. Cl.
  CPC ........ *B65F 2003/146* (2013.01); *G06Q 10/30* (2013.01); *Y02W 90/00* (2015.05)

(58) Field of Classification Search
  USPC .......................................................... 701/49
  See application file for complete search history.

(56) References Cited

U.S. PATENT DOCUMENTS

| | | | |
|---|---|---|---|
| 4,100,740 A | 7/1978 | Stewart | |
| 4,219,298 A | 8/1980 | Stagier et al. | |
| 4,349,305 A | 9/1982 | Wynn et al. | |
| 4,547,118 A | 10/1985 | Pittenger | |
| 5,014,206 A * | 5/1991 | Scribner | G07C 5/008 |
| | | | 701/517 |
| 5,145,305 A | 9/1992 | Green | |
| 5,178,226 A | 1/1993 | Bowman et al. | |
| 5,470,187 A | 11/1995 | Smith et al. | |
| 5,601,391 A | 2/1997 | Gazza | |
| 5,601,392 A | 2/1997 | Smith et al. | |
| 5,743,698 A | 4/1998 | Smith et al. | |
| 5,816,766 A | 10/1998 | Clark | |
| 5,851,100 A * | 12/1998 | Brandt | B65F 3/04 |
| | | | 414/408 |
| 5,861,580 A | 1/1999 | Moore et al. | |
| 5,890,865 A | 4/1999 | Smith et al. | |
| 5,954,470 A * | 9/1999 | Duell | B65F 3/28 |
| | | | 414/525.6 |
| 5,967,731 A | 10/1999 | Brandt | |
| 6,123,497 A | 9/2000 | Duell et al. | |
| 6,152,673 A | 11/2000 | Anderson et al. | |
| 6,158,945 A | 12/2000 | Anderson et al. | |
| 6,226,582 B1 | 5/2001 | Adsett et al. | |
| 6,332,745 B1 | 12/2001 | Duell | |
| 6,422,800 B1 | 7/2002 | Reichow et al. | |
| 6,648,576 B1 | 11/2003 | Duell et al. | |
| 7,070,381 B2 | 7/2006 | Khan | |
| 7,072,745 B2 | 7/2006 | Pillar et al. | |
| 7,559,732 B2 | 7/2009 | Khan et al. | |
| 7,559,733 B2 | 7/2009 | Khan et al. | |
| 7,559,734 B2 | 7/2009 | Khan et al. | |
| 7,681,340 B2 | 3/2010 | Treuthardt | |
| 7,725,225 B2 | 5/2010 | Pillar et al. | |
| 7,831,352 B2 | 11/2010 | Laumer et al. | |
| 7,937,162 B2 | 5/2011 | Thomson et al. | |
| 8,078,297 B2 | 12/2011 | Lasher et al. | |
| 8,092,141 B2 | 1/2012 | Curotto et al. | |
| 8,191,363 B2 | 6/2012 | Laumer et al. | |
| 8,550,764 B2 | 10/2013 | Rowland et al. | |
| 9,428,128 B2 | 8/2016 | Whitfield, Jr. et al. | |
| 9,428,334 B2 | 8/2016 | Whitfield, Jr. et al. | |
| 10,196,206 B2 | 2/2019 | Whitfield, Jr. et al. | |
| 2002/0159870 A1 * | 10/2002 | Pruteanu | B65F 3/041 |
| | | | 414/408 |
| 2002/0182044 A1 | 12/2002 | Yu | |
| 2003/0130765 A1 | 7/2003 | Pillar | |
| 2004/0055802 A1 | 3/2004 | Pillar | |
| 2005/0110330 A1 | 5/2005 | Khan | |
| 2006/0032657 A1 | 2/2006 | Kolbet | |
| 2006/0181108 A1 | 8/2006 | Cleland | |
| 2007/0278019 A1 * | 12/2007 | Santi | G01G 19/083 |
| | | | 177/136 |
| 2007/0294014 A1 | 12/2007 | Green | |
| 2008/0141805 A1 | 6/2008 | Birk | |
| 2008/0294314 A1 | 11/2008 | Morris | |
| 2009/0306863 A1 | 12/2009 | Curotto | |
| 2012/0282077 A1 | 11/2012 | Alberts | |
| 2013/0034412 A1 | 2/2013 | Goedken | |
| 2013/0039728 A1 | 2/2013 | Price et al. | |
| 2013/0302119 A1 | 11/2013 | Steege | |
| 2013/0343845 A1 | 12/2013 | Rowland et al. | |
| 2014/0266859 A1 | 9/2014 | Kurihara | |
| 2014/0343801 A1 | 11/2014 | Whitfield | |
| 2014/0375503 A1 | 12/2014 | Kurihara | |
| 2015/0077281 A1 | 3/2015 | Taniguchi | |
| 2015/0343976 A1 | 12/2015 | Lim | |
| 2016/0355335 A1 | 12/2016 | Whitfield et al. | |

OTHER PUBLICATIONS

Second Examination Report issued in Australian Application No. 2014202671, dated May 8, 2018, 4 pages.

\* cited by examiner

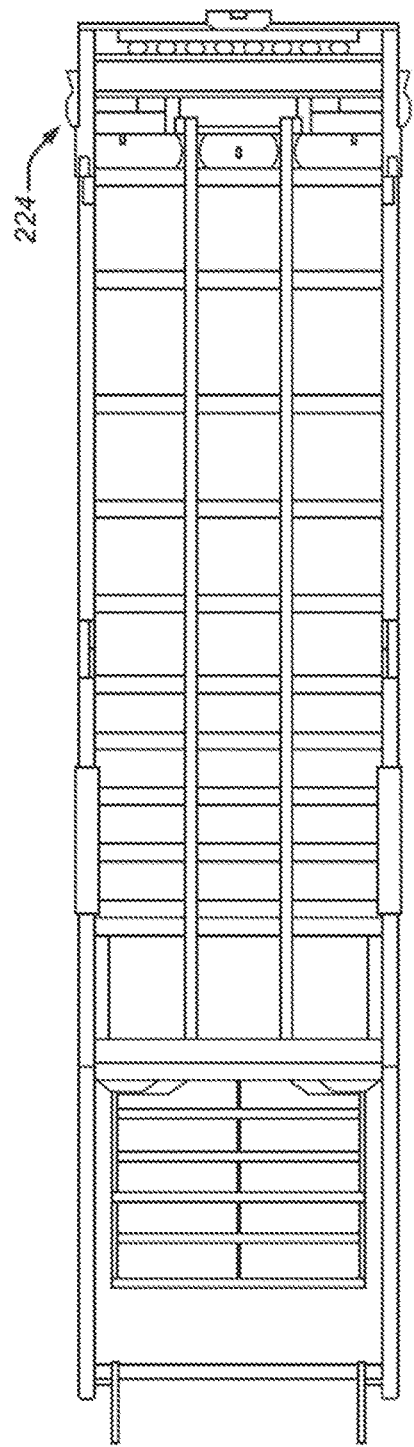
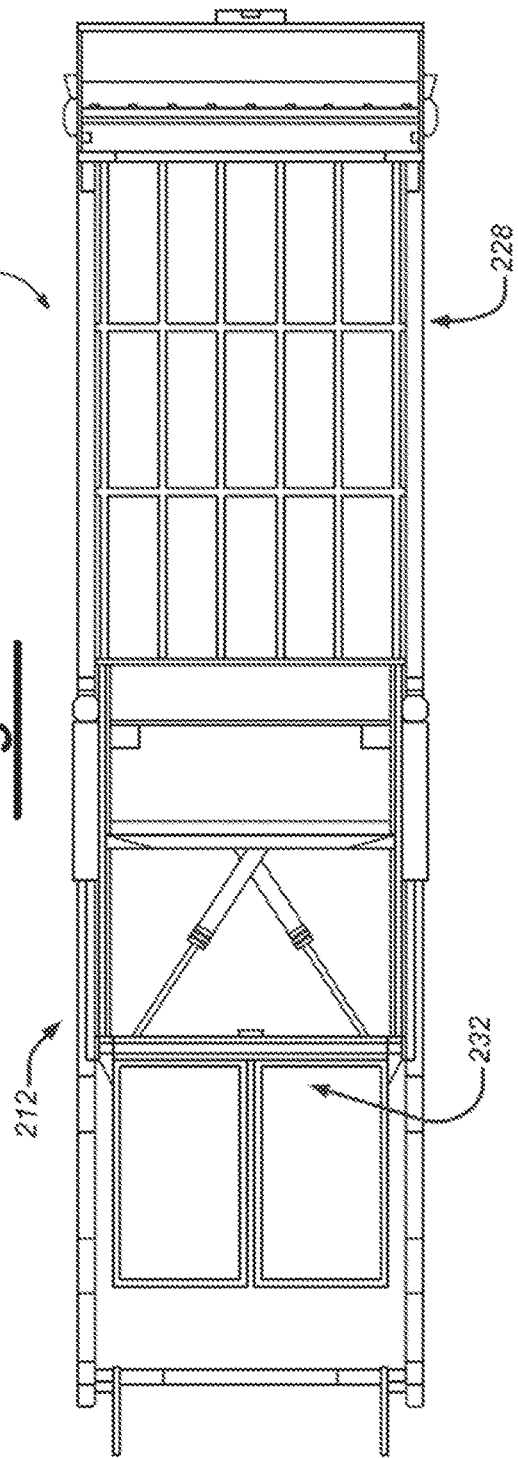

AUTOMATIC CONTROL OF A REFUSE FRONT END LOADER

CROSS-REFERENCE TO RELATED APPLICATIONS

This application is a continuation of U.S. patent application Ser. No. 15/244,291 filed on Aug. 23, 2016, which is a continuation of U.S. patent application Ser. No. 14/276,423 filed on May 13, 2014, now U.S. Pat. No. 9,428,334, which claims the benefit of U.S. Provisional Application No. 61/824,605, filed on May 17, 2013. The entire disclosures of the above applications are incorporated herein by reference.

FIELD

The present disclosure relates to refuse vehicles and, more particularly, an automatically controlled front end loader.

BACKGROUND

This section provides background information related to the present disclosure which is not necessarily prior art.

Refuse vehicles play a key role in dispensing of refuse by traversing an area, stopping at a location where the user, resident, commercial business, or the like has deposited refuse for collection, depositing the refuse in the refuse vehicle, and transporting the refuse to a processing center, such as a recycling center, landfill, or incineration center. With a continuing need to increase vehicle operator efficiency, there has been a growing trend to optimize operations within the refuse vehicle. For example, an operator may manually operate a front end loader in order to lift and empty residential refuse container. The operator may have to traverse obstacles such as power lines and trees. The operator may further have to monitor the capacity of the refuse truck hopper. Accordingly, a system designed to increase automation to retrieve residential refuse is desirable.

SUMMARY

This section provides a general summary of the disclosure, and is not a comprehensive disclosure of its full scope or all of its features.

An automatic control system for a refuse vehicle includes a mode select switch disposed within the vehicle that generates a mode select signal based on input from an operator of the vehicle, a control mechanism disposed within the vehicle that operates in response to the mode select signal, and a plurality of sensors adapted to sense a plurality of characteristics of the vehicle and adapted to communicate the plurality of sensed characteristics. The system further includes a control module that receives control instructions from the control mechanism and selectively controls at least one component of a plurality of components of the vehicle based on the mode select signal, at least one of the plurality of sensed characteristics, and the control instructions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a bottom view of the front loading refuse vehicle including a tailgate sensor;

FIG. 5 is a top view of the front loading refuse vehicle including a packer sensor and an overhead radar system.

Corresponding reference numerals indicate corresponding parts throughout the several views of the drawings.

DETAILED DESCRIPTION

Figure 1:
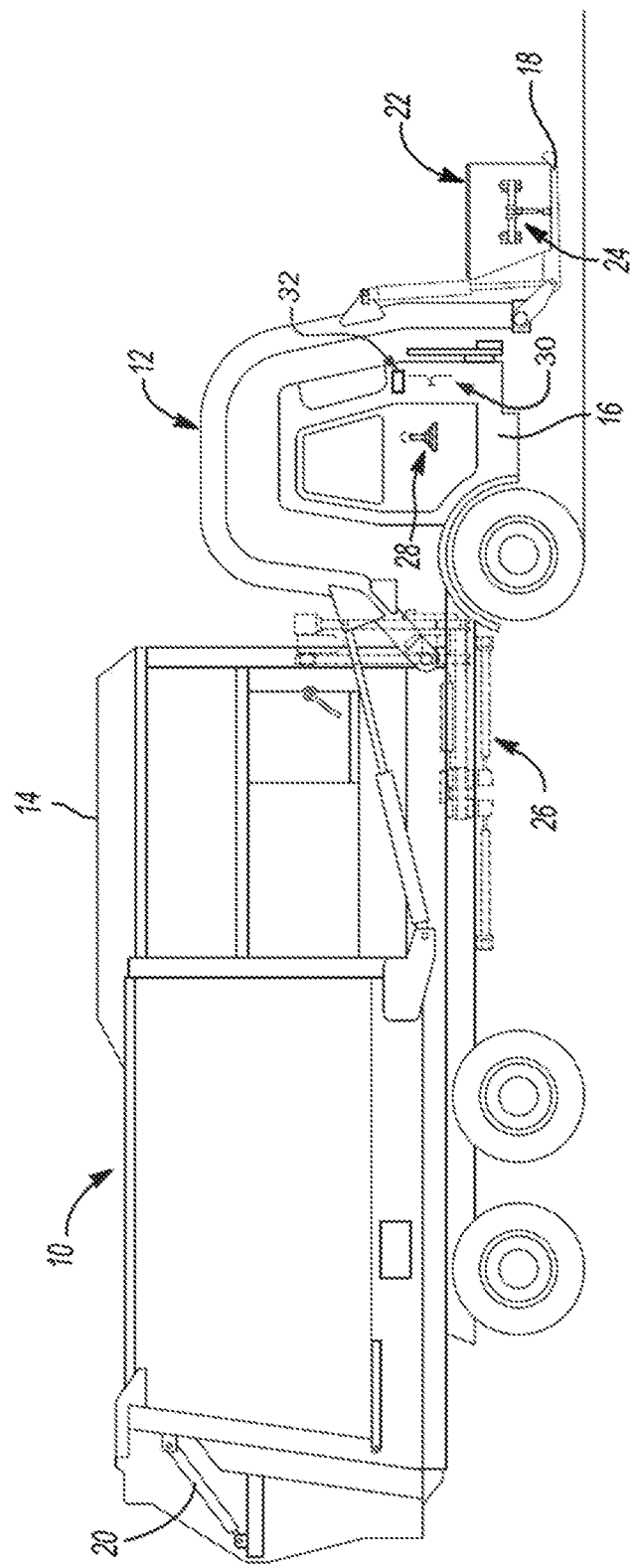
FIG. 1 is a side view of a front loading refuse vehicle including an automatically controlled system.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term module refers to a part of, or includes an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. In the example of a processor executing code, the term module includes memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

FIG. 1 depicts a side view of a front end loading refuse vehicle 10 arranged in accordance with various embodiments of the present disclosure. Vehicle 10 is configured as a front loading refuse vehicle and includes a front loading lift arm assembly 12 which connects to a front portion of a container or bin 14 and extends from behind the operator cab 16 to in front of the operator cab 16. Front loading lift arm assembly 12 includes a fork mechanism 18 which can be deployed to a generally horizontal position for engaging corresponding passages in an on-site refuse container 22.

The lift arm assembly 12 and the fork mechanism 18 may be controlled in a street-side driver position or a curbside driver position via a controller mechanism (not shown). In some embodiments, the controller mechanism may be a remotely mounted controller or a wireless controller.

Once fork mechanism 18 has engaged the container 22, lift arm assembly 12 is pivoted upwardly and rearwardly to invert the container 22 and dispose the contents into vehicle container 14 via a hopper. Refuse vehicle 10 may also include a hydraulically controlled compaction mechanism 20 which compacts refuse within container 14 to allow more refuse to be disposed therein. The compaction mechanism 20 may move refuse from the hopper into the bin 14 and initially position the refuse to optimize the weight of the vehicle 10. The compaction mechanism 20 is also used to eject the refuse at a transfer station or landfill. In some embodiments, the compaction mechanism 20 may also be controlled in the street-side driver position and the curbside driver position. The vehicle 10 may also include a container, such as a carry can loader that includes a loader arm 24. In another embodiment, the vehicle 10 may include a side arm loader 26.

Refuse vehicle 10 may include a control mechanism such as a joystick controller 28 for controlling the fork mechanism 18 and the front loading lift arm assembly 12 and for controlling the carry can loader arm 24. Alternatively or additionally, the joystick controller 28 may also control the side arm loader 26. The control mechanism is further configured so an operator of the vehicle 10 can operate at least one of the fork mechanism 18 and the lift arm assembly 12 via the control mechanism.

The fork mechanism 18 and the lift arm assembly 12 can be operated in one of a manual mode and an automatic mode. For example, when the fork mechanism 18 is operated in manual mode the fork mechanism 18 is pneumatically operated. Conversely, when the fork mechanism 18 is operated in automatic mode, the fork mechanism 18 is electrically operated. The control mechanism is configured to select at least one of the fork mechanism 18 and the lift arm assembly 12. The control mechanism is further configured to select at least one of the manual mode and the automatic mode of the fork mechanism 18 and the lift arm assembly 12.

Figure 6:
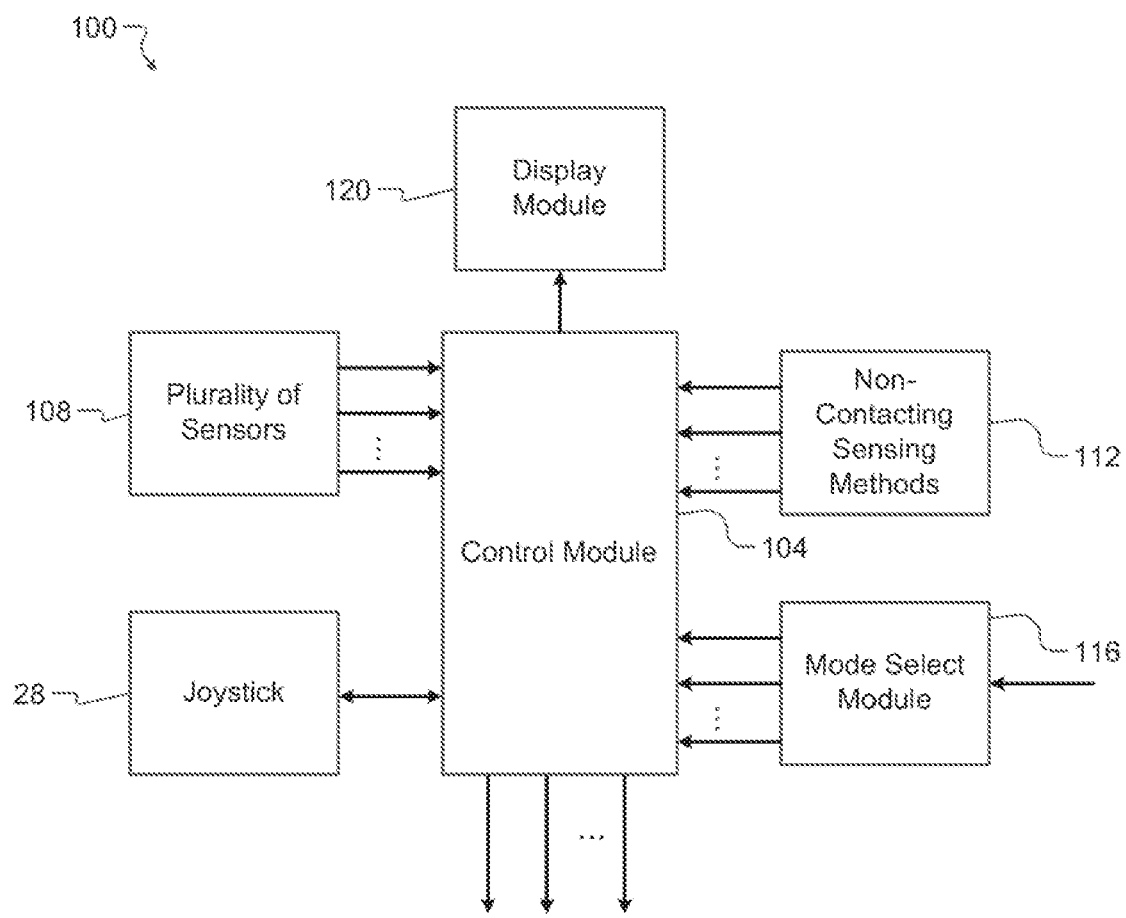
FIG. 6 is a functional block diagram of an automatic control system according to the principles of the present disclosure.

In some embodiments, the vehicle 10 includes an automatic control system 100 as illustrated in FIG. 6. The automatic control system 100 includes a control module 104. The control module 104 may be comprised of a processor with associated memory. The processor is configured to execute instructions stored in the memory. For example, the instructions may control components of the vehicle 10 when executed by the processor. The automatic control system 100 may automatically control the lift arm assembly 12, the fork mechanism 18, a tailgate of the vehicle 10, and the compaction mechanism 20. For example, the automatic control system 100 is configured to perform a smooth control operation. The smooth control operation includes keeping containers attached to the vehicle 10 level while emptying the containers into the bin 14.

The automatic control system 100 includes a plurality sensors 108 coupled to the vehicle 10. The plurality of sensors 108 continuously generate sensed data corresponding to various characteristics of the vehicle 10. For example only, one of the plurality of sensors 108 may be a position sensor attached to the fork mechanism 18. The position sensor senses a position of the fork mechanism 18 and communicates a value indicative of the position to the control module 104. The control module 104 then selectively controls the fork mechanism 18 in response to the position value. The automatic control system 100 may also include non-contacting sensing methods 112. In some embodiments, the control module 104 performs the smooth control operation based on the plurality of sensors 108 and the non-contacting sensing methods 112.

In some embodiments, the non-contacting sensing methods 112 include overhead radar that detects objects within a predetermined space above the vehicle 10, as described in detail below. The control module 104 may automatically lock the lift arm assembly 12 and the fork mechanism 18 based on a position of the lift arm assembly 12. The control module 104 receives at least one sensed value from the plurality of sensors 108. The control module 104 determines the position of the lift arm assembly 12 based on the sensed values. The control module 104 may also detect the presence of overhead obstructions based on the non-contacting sensing methods 112. For example, the control module 104 receives at least one sensed value from the non-contacting sensing methods 112.

The control module 104 determines whether an object above the vehicle 10 will obstruct operation of the lift arm assembly 12 and the fork mechanism 18 based on sensed value. For example, the control module 104 determines whether the sensed value indicates that an object is within a predetermined space above the vehicle 10. When the control module 104 determines the object is within the predetermined space, the control module 104 determines the object will obstruct the operation of the lift arm assembly 12 and the fork mechanism 18.

The control module 104 then controls the lift arm assembly 12 and the fork mechanism 18 in response to the determination. The automatic control system 100 may also control the compaction mechanism 20. For example, the control module 104 receives at least one sensed value corresponding to compaction mechanism 20 from the plurality of sensors 108. The control module 104 performs the smooth control operation to carry out refuse packing and refuse ejecting in response to the sensed value corresponding to the compaction mechanism 20.

In some embodiments, the lift arm assembly 12, the fork mechanism 18, and the compaction mechanism 20 are hydraulically controlled machines. For example, an operator of the vehicle 10 utilizes the joystick controller 28 that controls a primary control valve. The primary control valve may be an electrically operated control valve that will control one of at least four functions of a hydraulically controlled machine. The at least four functions include, but are not limited to, lift, lower, forward, and tilt. For example, the primary control valve may control one of the fork mechanism 18 and the lift arm assembly 12. The primary control valve may receive instructions from the joystick controller 28 to operate the fork mechanism 18 and the lift arm assembly 12. For example, the operator utilizes the joystick controller 28 to instruct the primary control valve to lift the fork mechanism 18. In another embodiment, the control module 104 receives instructions from the joystick controller 28. The control module 104 selectively controls the primary control valve in response to the instructions.

When the joystick controller 28 is utilized to operate the primary control valve, fluid is pumped to the primary control valve from within the vehicle 10. The fluid is pumped to the primary control valve to apply a force on the primary control valve. The force on the primary control valve causes the primary control valve to operate. For example, the force on the primary control valve causes the fork mechanism 18 to lift. Similarly, when the force is removed from the primary control valve, the fork mechanism 18 is returned to a neutral position. Fluid may then be pumped to a secondary control valve from within the vehicle 10. The fluid is pumped to the secondary control valve to apply a force on the secondary control value. The force on the secondary control valve causes the secondary control valve to operate. For example, the force on the secondary control valve causes the fork mechanism 18 to lower. Similarly, when the force is removed from the secondary control valve, the fork mechanism 18 is returned to a neutral position.

The automatic control system 100 controls a flow of fluid to the primary control valve during operation of the lift arm assembly 12 in order to reduce motion and stress on the lift arm assembly 12 and a residential container being lifted by the lift arm assembly 12. By electrically controlling the flow of fluid to the primary control valve, the automatic control system 100 may optimize hydraulically controlled structural motion for performance and structural integrity.

In some embodiments, the operator utilizes various operator controls, such as the joystick controller 28, to raise and lower a container from a collection position to a dumping position in the hopper of the vehicle 10. In another example, the street-side driver position is configured to utilize one of a dual axis single lever joystick and a dual, twin, single axis controller. Alternatively, the street-side driver position may utilize both of a single lever joystick and a dual, twin, single axis controller. In some embodiments, the street-side driver position only controls the lift arm assembly 12 and the fork mechanism 18 in a manual mode.

The lift arm assembly 12 and the fork mechanism 18 are configured to receive instructions from a multi-function joystick controller, such as the joystick controller 28. The function of the lift arm assembly 12 will vary based on a refuse collection mode. For example, the refuse collection mode may be, but is not limited to, a standard mode and an auto-lift mode. The operator of the vehicle 10 may select one of the standard mode and the auto-lift mode by actuating one of a plurality of switches 30 located within the vehicle 10. For example, the operator may actuate a first switch of the plurality of switches 30 to a first position. When the first switch is in the first position, the standard mode is selected.

The plurality of switches 30 communicate a switch signal indicating a position of each of the plurality of switches 30 to a mode select module 116, as shown in FIG. 6. The mode select module 116 determines a selected mode based on the position of each of the plurality of switches 30. For example, the mode select module 116 determines the standard mode is selected when the switch signal indicates the first switch is in the first position. The mode select module 116 communicates the selected mode to the control module 114. When the refuse collection mode is set to the standard operating mode, the joystick controller 28 will operate as a dual axis manual controller. When the joystick controller 28 operates as a dual axis manual controller, one axis will raise or lower the lift arm assembly 12 and another axis will raise and lower the fork mechanism 18.

The operator may select the auto-lift mode by actuating the first switch to a second position. When the refuse collection mode is set to the auto-lift mode, the joystick controller 28 operates as a primary controller for residential refuse collection. The auto-lift mode includes a hydraulic proportional control of the residential container attached to the lift arm assembly 12 and the fork mechanism 18. When the operator actuates a second switch while the auto-lift mode is enabled, the joystick controller 28 will operate to exclusively control the lift arm assembly 12 and the fork mechanism 18.

When the joystick controller 28 is controlling the lift arm assembly 12 and the fork mechanism 18, one axis of the joystick controller 28 will proportionally raise the lift arm assembly 12 and automatically tuck the fork mechanism 18 and residential container into the hopper of the vehicle 10. Similarly, another axis of the joystick controller 28 will proportionally lower the fork mechanism 18 until the residential container is clear of the hopper. The system may then lower the lift arm assembly 12 to return to a starting position. The second switch may be a console switch, a floor switch, a switch on the joystick controller 28, a switch on a steering wheel, or any other suitable switch.

In another embodiment, the automatic control system 100 may include an operator interface unit (OIU) 32. The OIU 32 may be mounted in a location convenient to both street-side driver position operation and curbside driver position operation. The OIU 32 is configured to continuously display a state of the vehicle 10 to the operator. The OIU 32 serves as the operator's interface to the state of the lift arm assembly 12, the fork mechanism 18, and the compaction mechanism 20 while the automatic control system 100 is controlling the lift arm assembly 12, the fork mechanism 18, and the compaction mechanism 20. The OIU 32 includes a plurality of indicators. The plurality of indicators may include, for example, a plurality of light emitting diodes (LEDs). The OIU 32 communicates a current state of one of the lift arm assembly 12, the fork mechanism 18, and the compaction mechanism 20 by toggling on and off the plurality of indicators as the state of one of the lift arm assembly 12, the fork mechanism 18, and the compaction mechanism 20 changes.

For example, the control module 104 receives at least one sensed position value from the plurality of sensors 108. The control module 104 determines a state of at least one of the lift arm assembly 12, the fork mechanism 18, and the compaction mechanism 20 based on the sensed position value. For example only, the sensed position value may be received from a position sensor attached to the compaction mechanism 20. The sensed position value indicates a current position of the compaction mechanism 20. The control module 104 determines the state of the compaction mechanism 20 based on the current position of the compaction mechanism 20. The control module 104 generates a display signal indicative of the current state of the compaction mechanism 20 and communicates the signal to the display module 120. The display module 120 is configured to actuate the plurality of indicators based on the display signal.

In some embodiments, the plurality of indicators may indicate the lift arm assembly 12 is raised, lowered, or in transition by lighting a predetermined combination of LEDs. The predetermined combination of LEDs indicates to the operator the state of the lift arm assembly 12. In yet another embodiment, a state of a controller input and a controller output may be accessible in order to diagnose faults in the automatic control system 100. For example, digital signals are represented by a name of the controller input (i.e., "Side Door Proximity Switch") followed by an on indicator or an off indicator. The on or off indicator may include a color indicator. The color indicator will vary depending on the state of the controller input. In one example, amber indicates off and red indicates on. Analog signals may be utilized to indicate actual value measurements from the plurality of sensors 108 as well as a potentially scaled value as used by the joystick controller 28. Network information may be obtained by utilizing an industry standard network such as the drivetrain J1939 network. The network information may include Road Speed and other suitable industry standard network information. The network information is displayed in order to allow the operator of the vehicle 10 to diagnose a location of a detected fault of the automatic control system 100.

The OIU 32 may also include operation mode indicators. For example, the operator may operate the vehicle 10 in a plurality of operating modes. The plurality of operating modes may include, but is not limited to, manual mode, carry can mode, and auto-lift mode. The OIU 32 is configured to indicate to the operator a current operating mode of the vehicle 10. For example, the operator selects one of the pluraty of operating modes by actuating one of the plurality of switches 30.

The plurality of switches 30 communicates a signal indicating the position of each of the plurality of switches 30 to the mode select module 116. The mode select module 116 determines the selected mode and communicates the selected mode to the control module 104. The control module 104 communicates a signal indicative of the current operating mode to the display module 120. The display module 120 actuates the plurality of indicators on the OIU 32 to indicate the operating mode of the vehicle 10. When the vehicle 10 is operating in the manual mode the operator controls the vehicle 10 in a manual position or with a multi-functional joystick in manual mode, such as the joystick controller 28. Similarly, when the operator actuates the first switch to the second position and enables the auto-lift mode, the OIU 32 indicates the vehicle 10 is operating in the carry can mode. When the operator actuates the second switch while operating in auto-lift mode, the OIU 32 indicates the vehicle 10 is operating in auto-lift mode.

Figure 2:
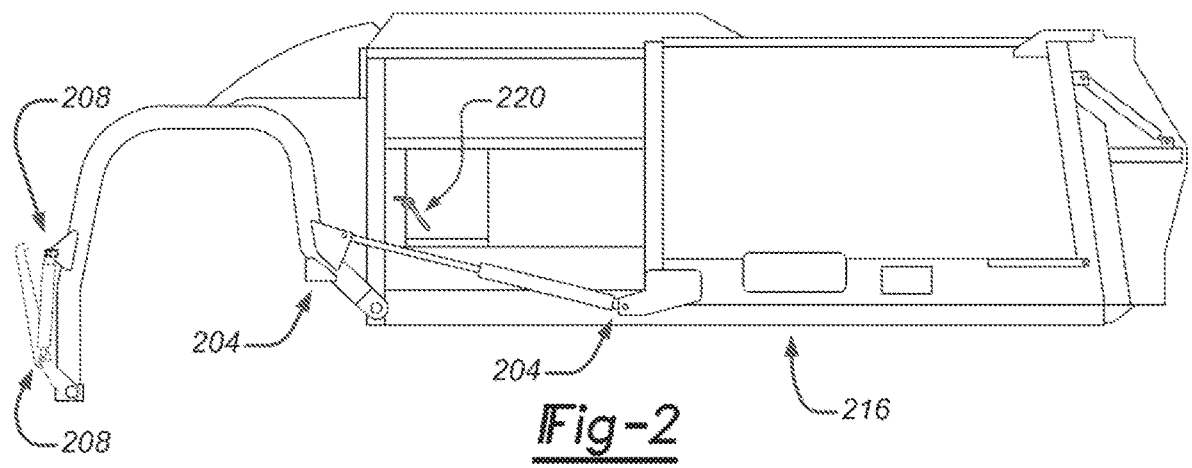
FIG. 2 is a side view of the front loading refuse vehicle including a side door sensor, a fork position sensor(s), an arm position sensor(s), and a body position sensor.

FIGS. 2-5 depict various embodiments of the vehicle 10 including the plurality sensors 108 attached to various components of the vehicle 10. The automatic control system 100 may utilize the plurality of sensors 108 in order to perform the smooth control operation. The plurality of sensors 108 includes an arm position sensor 204 attached to the lift arm assembly 12, a fork position sensor 208 attached to the fork mechanism 18, a packer sensor 212 attached to the compaction mechanism 20, and a body position sensor 216 attached to the body of the vehicle 10. As illustrated in FIG. 2, the arm position sensor 204 and the fork position sensor 208 may be located at a plurality of locations on the vehicle 10. Further, the vehicle 10 may include one or more arm position sensors 204 and one or more fork position sensors 208. The plurality of sensors 108 may further include a side door sensor 220, a tailgate sensor 224, and one or more weight sensors 228. The automatic control system 100 determines whether to allow a function that may potentially cause damage to the vehicle 10, the residential container, or the body of the vehicle 10 based on values received from the plurality of sensors 108. For example, while the residential container is below the top of the windshield of the vehicle 10, the automatic control system 100 will prevent the fork mechanism 18 from rotating the residential container far enough to collide with the front of the vehicle 10.

The automatic control system 100 may also be configured to generate an alarm based on at least one value received from the plurality of sensors 108. For example, the control module 104 receives at least one value from the arm position sensor 204. The at least one value may be indicative of a position of the lift arm assembly 12. The control module 104 determines whether the position of the lift arm assembly 12 is a safe travel position. For example, a safe travel position may include the lift arm assembly 12 being low enough to not make the truck over-height and safe to travel on residential roads. The lift arm assembly 12 may be in a position that makes the total height of the vehicle 10 too high for travel on residential roads. When the control module 104 determines the lift arm assembly 12 is not in a safe position, the control module 104 generates an alarm signal and communicates the signal to an alarm within the vehicle 10. The alarm indicates to the operator that the vehicle 10 is not in a safe position to operate on a road. It is understood that while only the lift arm assembly 12 is described, the automatic control system 100 may determine whether the vehicle 10 is in a safe position to operate based on sensor values relating to any mechanism or component of the vehicle 10.

The control module 104 may maintain a dump cycle counter. For example, the dump cycle counter may record the number of dump times the lift arm assembly 12 dumps refuse into the vehicle 10. The control module 104 may determine the number of dump cycles based on a value received from the arm position sensor 204. The value received from the arm position sensor 204 may indicate a position of the lift arm assembly 12. The control module 104 determines an angle of the lift arm assembly 12 relative to the vehicle 10. The control module 104 then determines a dump position of the lift arm assembly 12. In this way, the control module 104 determines whether a container has been emptied into the vehicle 10. The control module 104 then records a timestamp associated with the container being emptied. The control module 104 counts the number of timestamps in order to determine the number of times the lift arm assembly 12 has emptied a container into the vehicle 10.

In some embodiments, the control module 104 may control a deceleration of the lift arm assembly 12 and the fork mechanism 18 based on a sensed position of the lift arm assembly 12 and the fork mechanism 18. For example, the control module 104 is configured to electrically control a flow of fluid to primary and secondary control valves as described above. The control module 104 receives a sensed position from the arm position sensor 204. The sensed position may indicate a current position of the lift arm assembly 12. The control module 104 determines whether to increase or decrease the flow of fluid in order to control the deceleration of the lift arm assembly 12.

In another embodiment, position feedback on a grabber attached to the lift arm assembly 12 may allow control of a force used to grab a cart and to provide for damping of the grabber arm motion.

In some embodiments, the automatic control system 100 automatically rolls-in the residential container into the hopper based on at least one value received from the plurality of sensors 108 and a plurality of vehicle data. In this way, the automatic control system 100 may reduce the physical impact on the vehicle 10, the lift arm assembly 12, the fork mechanism 18, compaction mechanism 20, the residential can, and the operator. Further, depositing the residential container into the hopper may be unnoticeable to the operator. The plurality of vehicle data may include, but is not limited to, engine speed, road speed, temperature, and vehicle specification. It is understood that the plurality of vehicle data may be obtained through any standard industry practice. For example, the automatic control system 100 may communicate with a vehicle computer integrated into the vehicle 10. The vehicle computer may provide the plurality of vehicle data.

With particular reference to FIG. 2, a side view of the vehicle 10 in show with a side door sensor 220, a fork position sensor 208, an arm position sensor 204, and a body position sensor 216. In some embodiments, vertical positioning of the lift arm assembly 12 during collection will be variable depending on the collection method. The collection of residential refuse with a residential container requires that the lift arm assembly 12 and the fork mechanism 18 be adjustable as needed based on the conditions in the residential area being collected. Multiple methods will be used to set and subsequently reset the collection position including but not limited to operator selection of a hard or soft switch, manual adjustment via the collection controls (i.e. the joystick controller 28), or through mathematical averages based on a running average of collections. It is also possible to use the plurality of sensors 108 to automatically control and reposition the arms and forks based on road speed if allowed by the operator.

For example, the operator actuates the joystick controller 28 to initiate the automatic control and repositioning of the lift arm assembly 12 and the fork mechanism 18. The control module 104 receives a current position from the arm position sensor 204 and the fork position sensor 208. The control module 104 stores the current positions. The control module 104 then controls the lift arm assembly 12 and the fork mechanism 18 to raise and lower the container while keeping the container level. The control module 104 rolls the container into the hopper once control module 104 determines the container is above the cab of the vehicle 10. For example, the control module 104 continuously receives sensed positions from the arm position sensor 204 and the fork position sensor 208. The control module 104 determines the container is above the cab based on the sensed positions. The control module 104 then returns the lift arm assembly 12 and the fork mechanism 18 to the previously stored positions.

Such operation would allow the lift arm assembly 12 and the fork mechanism 18 to automatically store when the vehicle gets above a certain road speed such as 10 MPH and to return them to the collection position automatically when slowing down. The movement of a top door, if equipped, will be synchronized with the motion of the lift arm assembly 12 thus automating multiple tasks at one time. Interlocks would prevent the lift arm assembly 12 from colliding with the top door if the top door motion failed.

Figure 3:
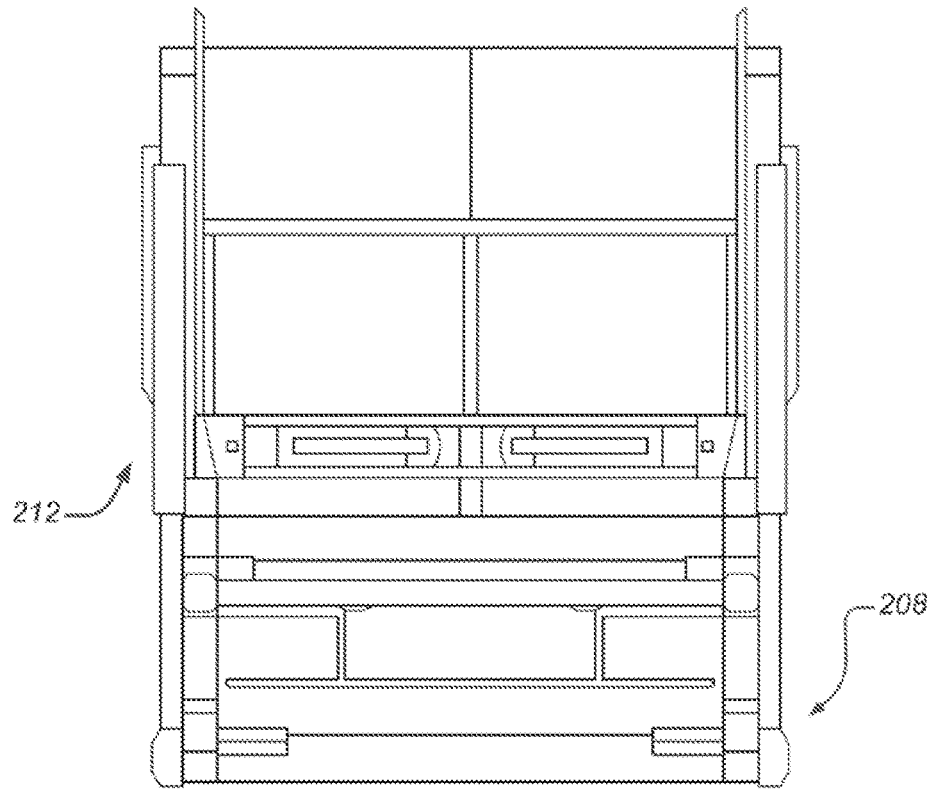
FIG. 3 is a rear view of the front loading refuse vehicle including a packer sensor, and a fork position sensor.

With particular reference to FIG. 3 a rear view of the vehicle 10 including a packer sensor 212 and a fork position sensor 208 is shown. In some embodiments, the operation of the compaction mechanism 20 will be automated thus allowing the operator to focus on the road and not the refuse load in the vehicle 10. The use of communication between main controllers and a scale system allows the optimization of packed loads. In this way, the automatic control system 100 distributes refuse from residential containers evenly throughout the collection day only using the force of the compaction mechanism 20 as needed to position the refuse. Road weights can be maintained by optimizing the loading of the body of the vehicle 10. In some embodiments, the control module 104 controls pack density and load distribution of a load in the vehicle 10. The control module 104 receives sensed values from the packer sensor 212, the arm position sensor 204, and the fork position sensor 208. The control module 104 also maintains a dump cycle count as described above.

The control module 104 also receives a load type from the plurality of switches 30. For example, the operator actuates one of the plurality of switches 30 to identify the type of load that is being collected. The type of load may include, but is not limited to, recyclables, paper, plastic, glass, co-mingled, household, and/or green waste. Depending on the load type, a predetermined packing profile is selected in order to control pack density and load distribution. In one example, the operator actuates a third switch to a first position of the plurality of switches 30. When the third switch is in the first position, the load type is co-mingled, for example. The control module 104 selects a predetermined packing profile based on the load type. The control module 104 then controls the lift arm assembly 12, the fork mechanism 18, and the compaction mechanism 20 in response to the sensed values, the dump cycle count, and the packing profile.

In some embodiments, the plurality of sensors 108 includes at least one weight sensor 228 as illustrated in FIG. 5. The weight sensor 228 may include, but is not limited to, axle based or chassis mounted load cells or strain gauges attached to the lift arm assembly 12 and the fork mechanism 18. The control module 104 determines a weight of a current load in the vehicle 10 based on sensed values received from the weight sensor 228. The control module 104 selectively controls the lift arm assembly 12, the fork mechanism 18, and the compaction mechanism 20 based on the sensed weight values, the sensed position values, the dump cycle counter, and the packing profile in order to achieve the highest pack density and even load distribution. For example, when packing recyclable material, a higher density pack may be achieved by holding a packing position at the end of a cylinder stroke to prevent 'memory'. Conversely, less packing force may be selected when packing glass or other breakable material.

Tailgate functions will be interlocked to road speed so that the tailgate cannot be opened or unlocked unless the vehicle 10 is below a certain road speed, such as 5 MPH, or in a particular transmission gear, such as first gear. Tailgate functions include, but are not limited to, locking the tailgate, unlocking the tailgate, raising the tailgate, and/or lowering the tailgate. The reverse can be accomplished by restricting a transmission of the vehicle 10 to a certain gear range or by restricting the vehicle 10 to an engine speed whenever the tailgate is unlocked or open.

With particular reference to FIG. 4, a bottom view of the vehicle 10 including a tailgate sensor 224 is shown. In some embodiments, the operator can choose to automatically eject a load where the automatic control system 100 could apply the brakes, unlock the tailgate, open the tailgate, and eject the load all automatically without any further operator intervention other than initiating the sequence and determining via visual observation or via other sensors such as radar or sonar whether the tailgate area is clear of obstructions. The reverse will be restricted from occurring.

With particular reference to FIG. 5, a top view of the vehicle 10 including a packer sensor 212 and an overhead obstruction system 232 are shown. In some embodiments, an overhead obstruction system 232 consists of an upward looking radar or sonar system that determines whether there are any objects in the path of the lift arm assembly 12 or the fork mechanism 18. The overhead obstruction system 232 is sensitive enough to be able to "see" utility wiring overhead (i.e., above the vehicle 10) but will only be limited to the range of the motion of the lift arm assembly 12 and the fork mechanism 18.

If there are objects in the path of the lift arm assembly 12 or the fork mechanism 18 the overhead obstruction system 232 communicates a signal indicative of the distance between the vehicle 10 and the object to the control module 104. The control module 104 determines whether the object will obstruct the operation of the lift arm assembly 12 and the fork mechanism 18 as described above. When the control module 104 determines the objects will obstruct the lift arm assembly 12 and the fork mechanism 18, the control module 104 interlocks the lift arm assembly 12 and the fork mechanism 18 and generates an alarm signal. The control module 104 communicates the alarm signal to the alarm. The alarm will indicate to the operator that the lift arm assembly 12 has reached the top of the windshield and the lift arm assembly 12 will be interlocked to prevent damage to the lift arm assembly 12 and/or residential property.

In some implementations, the control module 104 prevents the tailgate from rising based on the signal received from the overhead obstruction system 232. For example, the control module 104 receives the signal as described above. The control module 104 determines whether an object will obstruct the operation of the tailgate as described with respect to the lift arm assembly 12 and the fork mechanism 18. When the control module 104 determines the objects will obstruct the tailgate, the control module 104 interlocks the tailgate and generates an alarm signal. The control module 104 communicates the alarm signal to the alarm. The alarm will indicate to the operator that the tailgate will be interlocked to prevent damage to the tailgate and/or residential property.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refuse vehicle, comprising:
a container coupled to a chassis of the refuse vehicle;
a lift coupled to the container, the lift comprising an arm assembly configured to engage a refuse receptacle;
a plurality of sensors configured to monitor the lift and output sensed data;
a multi-mode operator-actuated controller;
an automatic control system comprising a processor configured to execute instructions stored in memory to:
based on a state of the multi-mode operator-actuated controller and at least a portion of the sensed data, instruct the lift to execute a dump cycle to dump refuse from the refuse receptacle into the container; and
an operator interface unit configured to display an operating mode of the operator-actuated controller and a state of the lift based on at least a portion of the sensed data,
wherein the plurality of sensors comprises an arm position sensor attached to the arm assembly of the lift and an obstruction sensor configured to detect a presence of an object within a distance from the arm assembly of the lift,
wherein the sensed data comprises: i) a value from the arm position sensor indicative of a position of the arm assembly, and ii) a signal indicative of the distance between the object and the arm assembly of the lift, and
wherein the processor of the automatic control system is further configured to execute instructions stored in memory to:
i) determine whether the object obstructs an operation of the lift based on the value from the arm position sensor, and ii) modify one or more functions of the lift based on the values from the arm position sensor and the obstruction sensor.

2. The refuse vehicle of claim 1, wherein the refuse vehicle defines a forward direction of travel, and wherein the container resides on the chassis of the refuse vehicle behind an operator cab of the refuse vehicle.

3. The refuse vehicle of claim 2, wherein the arm assembly comprises a front-loading arm assembly extending from behind the operator cab to in front of the operator cab, and wherein the refuse receptacle comprises a carry can supporting a loader arm.

4. The refuse vehicle of claim 3, wherein the front-loading arm comprises a fork mechanism engaging the front-loading arm to the carry can.

5. The refuse vehicle of claim 4, wherein the processor of the automatic control system is further configured to execute instructions stored in memory to:
   i) determine whether the object obstructs an operation of the fork mechanism based on the value from the obstruction sensor, and
   ii) modify one or more functions of the fork mechanism based on the value from the obstruction sensor.

6. The refuse vehicle of claim 2, wherein the arm assembly comprises a side-loading arm assembly residing behind the operator cab.

7. The refuse vehicle of claim 1, wherein the multi-mode operator-actuated controller comprises a joystick controller.

8. The refuse vehicle of claim 7, wherein the state of the multi-mode operator-actuated controller comprises an auto-lift mode and actuation of the joystick controller along an axis.

9. The refuse vehicle of claim 1, wherein the processor of the automatic control system is further configured to execute instructions stored in memory to generate an alarm in response to a determination based on the value from the arm position sensor that the refuse vehicle height is greater than a predetermined threshold height.

10. The refuse vehicle of claim 9, wherein the operator interface unit is configured to display an indicator corresponding to the alarm.

11. The refuse vehicle of claim 1, wherein the processor of the automatic control system is further configured to execute instructions stored in memory to decelerate movement of the lift during the dump cycle based on the value from the arm position sensor.

12. The refuse vehicle of claim 1, wherein the plurality of sensors comprises a weight sensor attached to the arm assembly of the lift.

13. The refuse vehicle of claim 12, wherein the weight sensor comprises at least one of a load cell or a strain gauge.

14. The refuse vehicle of claim 1, wherein the obstruction sensor is an overhead obstruction sensor configured to sense a space above the refuse vehicle and to sense a distance between (i) the refuse vehicle and (ii) objects within the space that are external to the refuse vehicle.

15. The refuse vehicle of claim 14, wherein the processor of the automatic control system is further configured to execute instructions stored in memory to inhibit one or more functions of the lift in response to a determination that the distance is less than a predetermined threshold distance.

16. The refuse vehicle of claim 1, wherein the processor of the automatic control system is further configured to instruct the lift based on vehicle data comprising a road speed.

17. The refuse vehicle of claim 16, wherein the processor of the automatic control system is configured to:
   determine that the road speed is below a predetermined threshold speed and responsively return the lift to a stored position; and
   determine that the road speed is above a predetermined threshold speed and responsively inhibit one or more functions of the lift.

18. The refuse vehicle of claim 1, wherein the processor of the automatic control system is further configured to execute instructions stored in memory to generate an alarm in response to a determination based on the value from the obstruction sensor that the object obstructs the operation of the lift.

19. The refuse vehicle of claim 1, wherein the value from the arm position sensor is a measured angle.

20. The refuse vehicle of claim 1, wherein the processor of the automatic control system is further configured to execute instructions stored in memory to:
   i) determine whether the object obstructs an operation of a tailgate of the refuse vehicle based on the value from the obstruction sensor, and
   ii) generate an alarm in response to a determination based on the value from the obstruction sensor that the object obstructs the operation of the tailgate.

* * * * *